United States Patent
Chung et al.

(10) Patent No.: US 7,577,333 B2
(45) Date of Patent: Aug. 18, 2009

(54) METHOD AND APPARATUS FOR RECORDING AND REPRODUCING VIDEO DATA, AND INFORMATION STORAGE MEDIUM IN WHICH VIDEO DATA IS RECORDED BY THE SAME

(75) Inventors: Hyun-kwon Chung, Gyeonggi-do (KR); Bong-gil Bak, Seoul (KR); Sung-wook Park, Seoul (KR); Jung-wan Ko, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1178 days.

(21) Appl. No.: 09/978,771

(22) Filed: Oct. 18, 2001

(65) Prior Publication Data

US 2003/0035649 A1 Feb. 20, 2003

(30) Foreign Application Priority Data

Aug. 4, 2001 (KR) .......................... 2001-0047142
Sep. 27, 2001 (KR) .......................... 2001-0060257
Oct. 15, 2001 (KR) .......................... 2001-0063377

(51) Int. Cl.
*H04N 5/76* (2006.01)
*H04N 7/00* (2006.01)
*H04N 5/00* (2006.01)

(52) U.S. Cl. ......................................... 386/46; 386/125
(58) Field of Classification Search ............... 386/45–4, 386/33, 95, 111–112, 125–126, 6

See application file for complete search history.

(56) References Cited

U.S. PATENT DOCUMENTS 5,295,203 A 3/1994 Krause et al.
5,617,145 A 4/1997 Huang et al.

(Continued)

FOREIGN PATENT DOCUMENTS

EP 0 757 491 A2 2/1997

(Continued)

OTHER PUBLICATIONS

"Fast and Easy Creating and Copying CD-Rom, Audio-CD, Video-CD, DVD Discs," under F.N. Resnikov's edition, Moscow, Best Books, 2000, pp. 168-234.

(Continued)

*Primary Examiner*—Thai Tran
*Assistant Examiner*—Nigar Chowdhury
(74) *Attorney, Agent, or Firm*—Stein, McEwen & Bui, LLP

(57) ABSTRACT

A method of recording and reproducing video data is provided. The method of recording video data in an information storage medium includes the steps of (a) decoding originally encoded video data, (b) re-encoding the decoded video data in a different way to the originally encoded video data, (c) generating video transform information which is to be referred to for decoding the video data into its original state, and (d) recording the generated video transform information and the re encoded video data in the information storage medium. Accordingly, the video data can be properly reproduced even if it is re-encoded in a different way to the originally encoded video data.

2 Claims, 15 Drawing Sheets

U.S. PATENT DOCUMENTS

| | | | | |
|---|---|---|---|---|
| 5,717,816 | A * | 2/1998 | Boyce et al. | 386/111 |
| 6,400,886 | B1 * | 6/2002 | Brewer et al. | 386/52 |
| 6,591,059 | B1 * | 7/2003 | Asada et al. | 386/94 |
| 6,724,981 | B1 * | 4/2004 | Park et al. | 386/125 |
| 6,785,464 | B1 * | 8/2004 | Kato | 386/52 |
| 6,980,732 | B1 * | 12/2005 | Suzuki | 386/68 |
| 2002/0006165 | A1 | 1/2002 | Kato | |
| 2003/0152366 | A1 * | 8/2003 | Kanazawa et al. | 386/69 |

FOREIGN PATENT DOCUMENTS

| | | |
|---|---|---|
| EP | 0 849 958 A2 | 6/1998 |
| EP | 0 868 091 A2 | 9/1998 |
| EP | 0 913 822 A2 | 10/1998 |
| EP | 0 913 822 | 5/1999 |
| EP | 0913822 | 5/1999 |
| EP | 1 067 789 | 12/2001 |
| GB | 2 350 514 | 11/2000 |
| JP | 09-116866 | 5/1997 |
| JP | 10-307746 | 11/1998 |
| JP | 11-161663 | 6/1999 |
| JP | 11-341440 | 12/1999 |
| JP | 2000-10534 | 1/2000 |
| JP | 2000-134618 | 5/2000 |
| JP | 2000-354242 | 12/2000 |
| JP | 2001-016589 | 1/2001 |
| JP | 2001-24823 | 1/2001 |
| KR | 2001-110147 | 12/2001 |
| WO | WO 01/15167 | 3/2001 |

OTHER PUBLICATIONS

Office Action issued in Japanese Patent Application No. 2002-68983 on Aug. 2, 2005.
V.L. Pershikov, et al., "Explanatory Dictionary of Informatics", Finances and Statistics, 1995, pp. 222-223.
P.K. Gorokhov, "Explanatory Dictionary of Radioelectronics", Russian Language, 1993, pp. 60-61.
E. Rudometov, et al., "Hardware Means and Multimedia", Reference Book. 1999, pp. 188-203.
A. Borzenko, et al., "Multimedia for All", Computer Press, 1995, 158-159.
Office Action issued in Japanese Patent Application No. 2002-68983 on Nov. 29, 2005.
Office Action issued Mar. 28, 2006 by the Japan Patent Office re: Japanese Patent Application No. 2002-68983 (2 pp).
Substantive/Modified Substantive Examination Report and Search Report issued Dec. 11, 2006 re: Malaysian Patent Application No. PI20020156 (3 pp).
General Translation of Office Action issued Jan. 23, 2007 re: Mexican Patent Application No. PA/a/2002/006516 (2 pp).
Korean Office Action dated Nov. 30, 2007 of the Korean Patent Application No. 2001-63377.
Search Report issued on Jan. 19, 2008 by the Intellectual Property Office of Singapore for Singapore Patent Application No. 200600681-1.
European Search Report dated Oct. 25, 2004.

* cited by examiner

FIG. 3
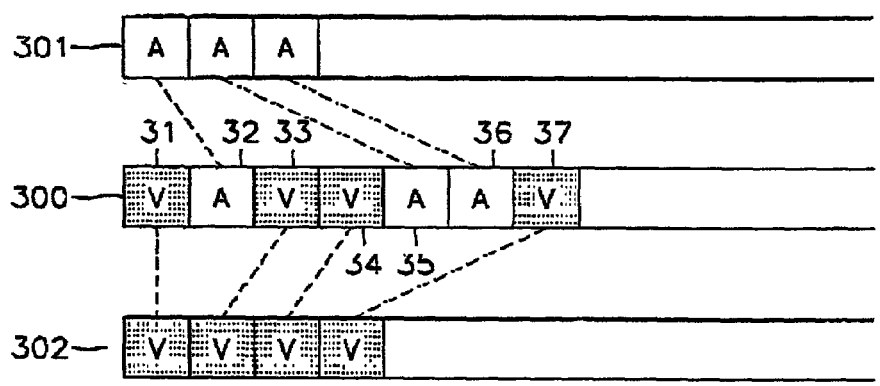
FIG. 4
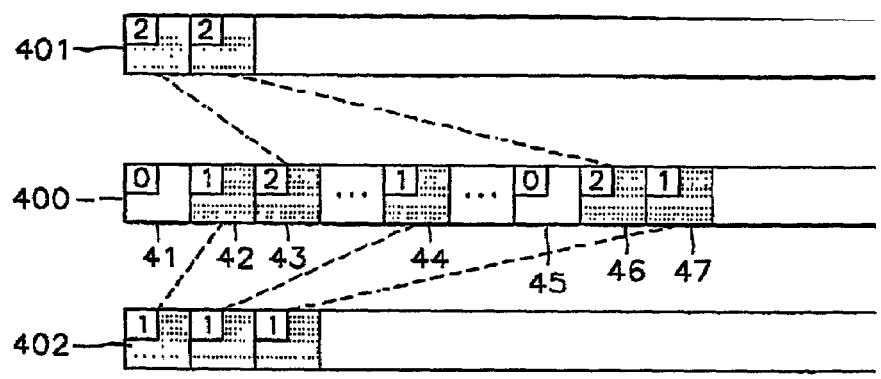
FIG. 5
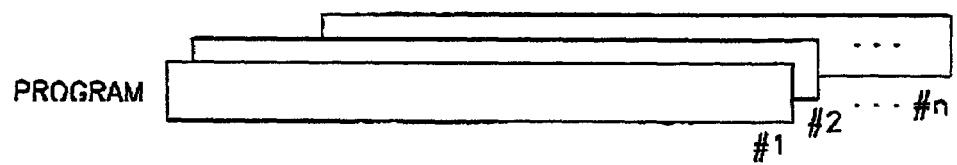

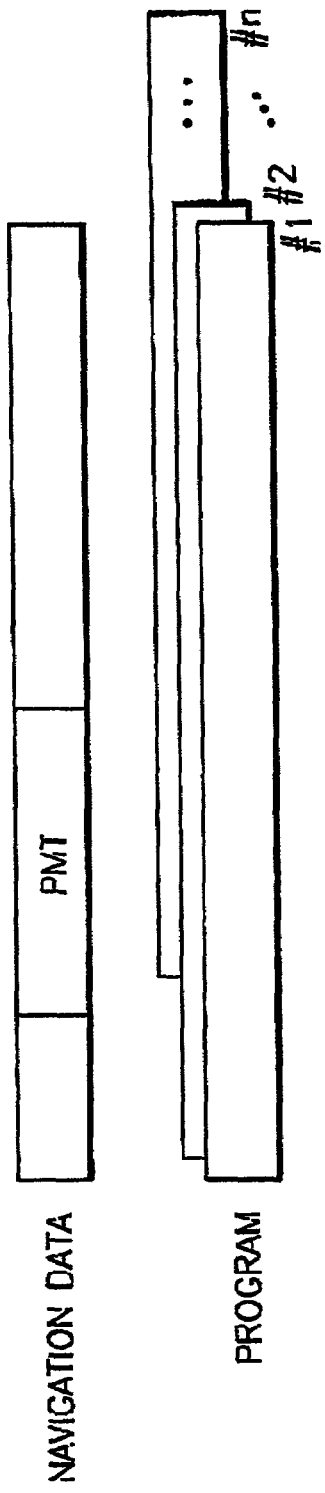
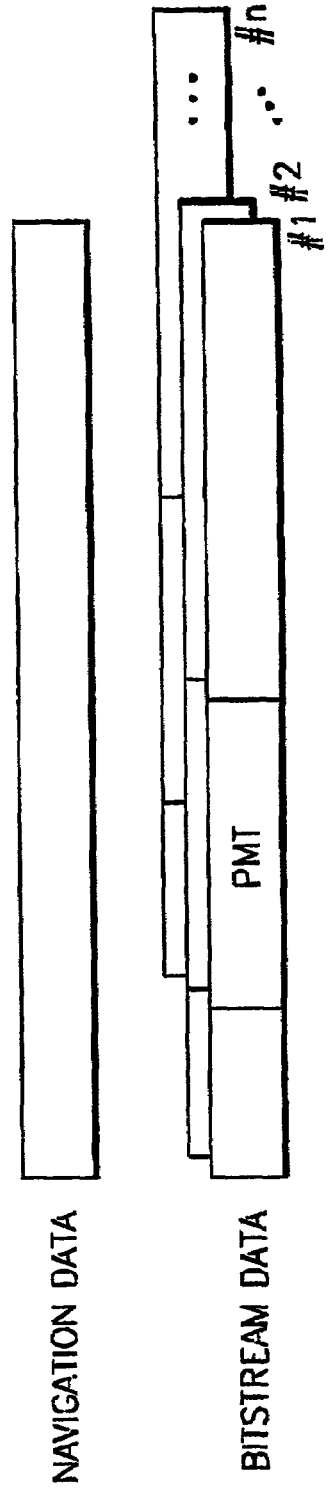

FIG. 7

| VOLUME MANAGER TABLE | VOL_GI (VOLUME GENERAL INFORMATION) | | PG Ns |
|---|---|---|---|
| | PG_SRPT (PROGRAM SEARCH POINTER TABLE) | | PG_IT_SRP # |
| | PG_IT # (PROGRAM INFORMATION TABLE) | PG_IT_GI (PG_IT GENERAL INFORMATION) | PAI_SA |
| | | | PMT_SA |
| | | | TAMP_SA |
| | | PAT (PROGRAM ASSOCIATION TABLE) | PAT ACCORDING TO MPEG TS SPECIFICATION |
| | | PMT (PROGRAM MAP TABLE) | PMT ACCORDING TO MPEG TS SPECIFICATION |
| | | TAMP (TIME MAP) | TIME VS. POSITION MAPPING TABLE |

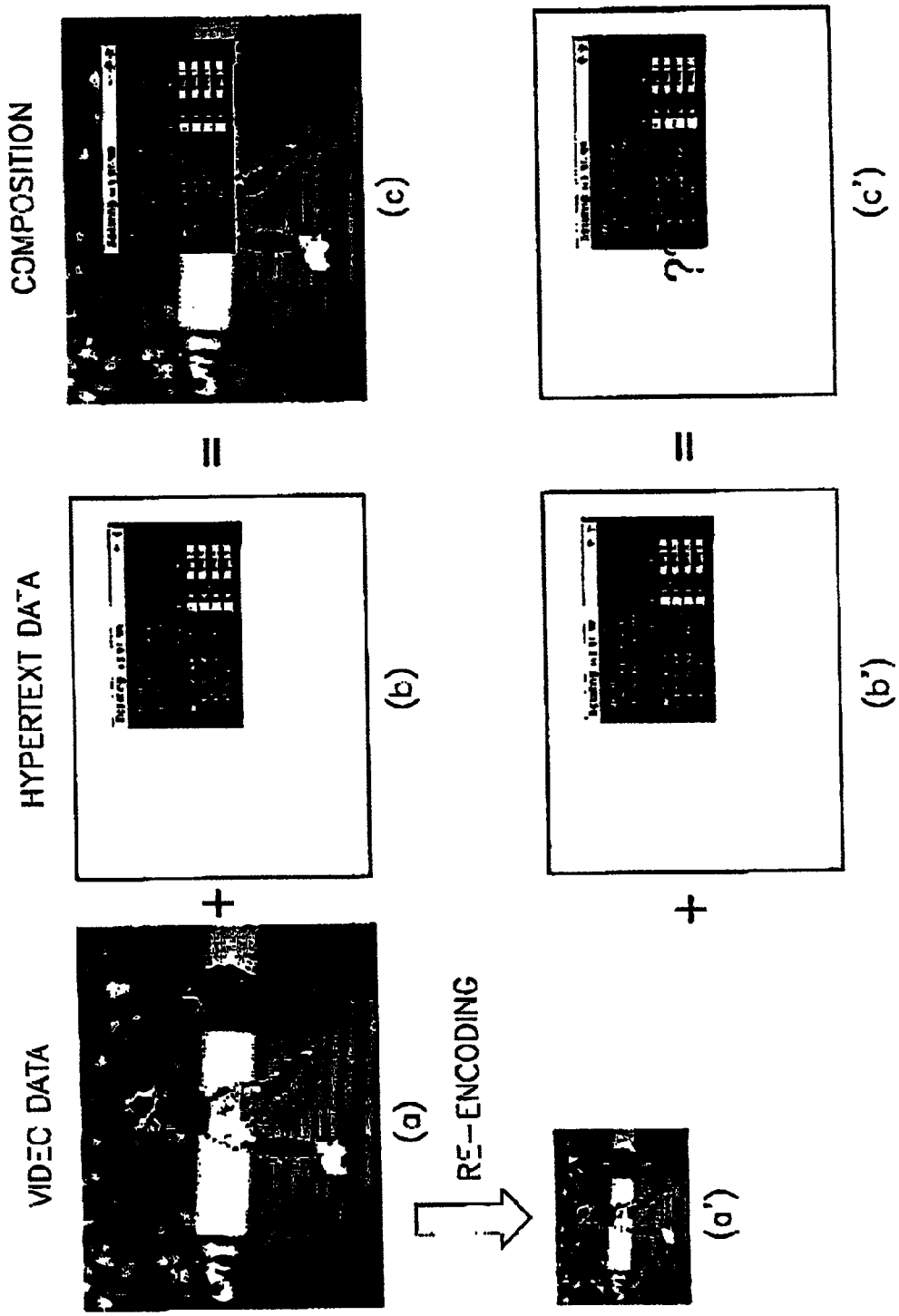

METHOD AND APPARATUS FOR RECORDING AND REPRODUCING VIDEO DATA, AND INFORMATION STORAGE MEDIUM IN WHICH VIDEO DATA IS RECORDED BY THE SAME

This application claims the benefit of Korean Application No. 2001-47142, filed Aug. 4, 2001, Korean Application No. 2001-60257, filed Sep. 27, 2001, and Korean Application No. 2001-63377, filed Oct. 15, 2001, in the Korean Intellectual Property Office, the disclosures of which are incorporated herein by reference.

BACKGROUND OF THE INVENTION

1. Field of the Invention

The present invention relates to a method of recording and reproducing video data, and more particularly, to a method of recording and reproducing video data and hypertext data.

2. Description of the Related Art

Video data and hypertext data are multiplexed in a digital broadcast signal. The video data and the hypertext data are transmitted in the form of a MPEG transport stream (TS) A user receives an MPEG TS and records it in an information storage medium and can reproduce the MPEG TS when he/she wants to see it.

FIG. 17 is a diagram for explaining the problem of the prior art. Referring to FIG. 17, video data (a) and hypertext data (b) are separately decoded and composed, so an MPEG TS is reproduced as a composition (c). However, when the video data (a) in the MPEG TS has been decoded and video data (a') re-encoded in another way has been recorded, the video data (a') and the hypertext data (b) are not properly composed and displayed during reproduction.

SUMMARY OF THE INVENTION

To solve the above-described problems, it is an object of the present invention to provide a method and apparatus for properly reproducing video data and hypertext data even if the video data has been re-encoded in a different way and recorded, and an information storage medium.

To achieve the above object of the invention, in one embodiment, there is provided a method of recording video data in an information storage medium. The method includes the steps of (a) decoding originally encoded video data; (b) re-encoding the decoded video data in a different way to the originally encoded video data; (c) generating video transform information which is to be referred to for decoding the video data into its original state; and (d) recording the generated video transform information and the re-encoded video data.

In another embodiment, there is provided a method of recording video data in an information storage medium. The method includes the steps of (a) separating originally encoded video data from a bitstream containing the originally encoded video data and hypertext data and decoding the originally encoded video data; (b) re-encoding the decoded video data in a different way to the originally encoded video data; (c) generating video transform information which is to be referred to for decoding the re-encoded video data into its original state; and (d) multiplexing the generated video transform information, the re-encoded video data, and the hypertext data into a bitstream; and (e) recording the multiplexed bitstream in the information storage medium.

In still another embodiment, there is provided a method of recording video data in an information storage medium. The method includes the steps of (a) separating originally encoded video data from a bitstream into which the originally encoded video data and hypertext data are multiplexed and decoding the originally encoded video data; (b) re-encoding the decoded video data in a different way to the originally encoded video data; (c) generating video transform information which is to be referred to for decoding the video data into its original state; (d) recording the generated video transform information in a navigation data area of the information storage medium; (e) multiplexing the re-encoded video data and the hypertext data, which is to be reproduced together with the video data, into a bitstream; and (f) recording the multiplexed bitstream in a program area of the information storage medium.

To achieve the object of the present invention, there is also provided an information storage medium including video data which has been re-encoded in a different way to originally encoded video data, and video transform information which should be referred to for decoding the video data into an original state.

Preferably, the information storage medium further includes audio data reproduced together with the video data, hypertext data displayed together with the video data, and program configuration data necessary for reproducing the video data.

Preferably, the video data, the audio data, and the video transform information are multiplexed and recorded in a program area, or the video data, the audio data, and the hypertext data are multiplexed and recorded in the program area, and the video transform information is recorded in a navigation data area as the program configuration data.

More preferably, the video data, the audio data, and the hypertext data are multiplexed and recorded in the program area in the form of a Moving Picture Experts Group (MPEG) transmission stream, and the video transform information is recorded in the navigation data area as program map table (PMT) configuration information.

Preferably, the video transform information has been embedded in a video element descriptor as a video transform descriptor, and the video transform descriptor has a horizontal resolution, a vertical resolution, and an aspect ratio as variables.

There is also provided an apparatus for receiving an input bitstream and recording a bitstream in an information storage medium. The apparatus includes a filter for extracting video data from the input bitstream; a recorder for decoding the extracted video data, re-encoding the decoded video data in a different way to the originally encoded video data, recording the re-encoded video data, and recording video transform information which is to be referred to for decoding the video data into its original state; and a controller for generating and providing the video transform information to the recorder.

Preferably, the recorder records the video transform information in a program area together with the re-encoded video data or records the video transform information in a navigation data area.

The filter includes a demultiplexer for demultiplexing the input bitstream into video data, audio data, hypertext data, and program information data. The controller includes a video transform information generator for generating and outputting the video transform information which is to be referred to for decoding the video data into its original state. The recorder includes a video decoder for decoding the video data received from the demultiplexer, a video encoder for re-encoding the decoded video data, and a multiplexer for multiplexing the generated video transform information and the re-encoded video data.

Preferably, the controller includes a filter for extracting a PMT packet from the program information data output from the demultiplexer, and a generator for generating PMT configuration information containing the video transform information based on the extracted PMT packet. The recorder records the PMT configuration information in the navigation data area.

To achieve the object of the present invention, in one embodiment there is provided a method of reproducing video data from an information storage medium in which video data which has been re-encoded in a different way to originally encoded video data and video transform information which should be referred to for decoding the video data into its original state are recorded. The method includes the steps of (a) reading video data and hypertext data from a program area; (b) reading video transform information from a navigation data area; and (c) multiplexing the video data, the hypertext data, and the video transform information and outputting the result of multiplexing In another embodiment, there is provided a method of reproducing video data from an information storage medium in which video data which has been re-encoded in a different way to originally encoded video data and video transform information which should be referred to for decoding the video data into its original state are recorded. The method includes the steps of (a) reading a bitstream, into which video data, hypertext data, and video transform information have been multiplexed, from a program area; (b) demultiplexing the bitstream into the video data, the hypertext data, and the video transform information; (c) decoding the video data referring to the video transform information; (d) decoding the hypertext data; and (e) blending the decoded video data and the decoded hypertext data and outputting the result of blending.

To achieve the object of the invention, in one embodiment there is provided an apparatus for reproducing video data from an information storage medium in which video data which has been re-encoded in a different way to originally encoded video data and video transform information which should be referred to for decoding the video data into its original state are recorded. The apparatus includes a reader for reading video data and hypertext data, which have been recorded in the form of a bitstream, from a program area and reading program information data containing video transform information from a navigation data area; a video transform information extractor for extracting the video transform information from the program information data; and a remultiplexer for multiplexing the video data and the hypertext data, which are provided from the reader, and the video transform information provided from the video transform information extractor and outputting the result of multiplexing.

The apparatus further includes a demultiplexer for demultiplexing the bitstream into the video data and the hypertext data; a video decoder for decoding the video data received from the demultiplexer referring to the extracted video transform information; a hypertext data decoder for decoding the hypertext data received from the demultiplexer; and a blender for blending the decoded hypertext data and the decoded video data and outputting the result of blending Preferably, the reader reads an MPEG transmission stream into which video data, audio data, and hypertext data have been multiplexed. Preferably, the video transform information extractor generates a PMT packet containing the video transform information as PMT configuration information. Preferably, the remultiplexer multiplexes the MPEG transmission stream and the PMT packet and outputs the result of multiplexing.

In another embodiment, there is provided an apparatus for reproducing video data from an information storage medium in which video data which has been re-encoded in a different way to originally encoded video data and video transform information which should be referred to for decoding the video data into its original state are recorded. The apparatus includes a reader for reading a bitstream, into which vide data, hypertext data, and video transform information have been multiplexed, from a program area; a demultiplexer for demultiplexing the read bitstream into the video data, the hypertext data, and the video transform information; a parser for extracting the video transform information; a video decoder for decoding the video data received from the demultiplexer referring to the extracted video transform information; a hypertext data decoder for decoding the hypertext data received from the demultiplexer; and a blender for blending the decoded hypertext data and the decoded video data and outputting the result of blending.

BRIEF DESCRIPTION OF THE DRAWINGS

The above objects and advantages of the present invention will become more apparent by describing in detail preferred embodiments thereof with reference to the attached drawings in which:

FIGS. 3 and 4 are diagrams for explaining an MPEG transport stream (TS);

FIG. 5 is a diagram of a data structure in an information storage medium in which an MPEG TS is recorded by a recording apparatus according to the present invention;

FIGS. 6A and 6B are diagrams of the data structures of video transform information which is recorded according to embodiments of the present invention;

FIG. 7 is a diagram of the data structure of a navigation data according to an embodiment of the present invention;

FIG. 17 is a diagram for explaining the problem of the prior art.

DETAILED DESCRIPTION OF THE INVENTION

Figure 1:
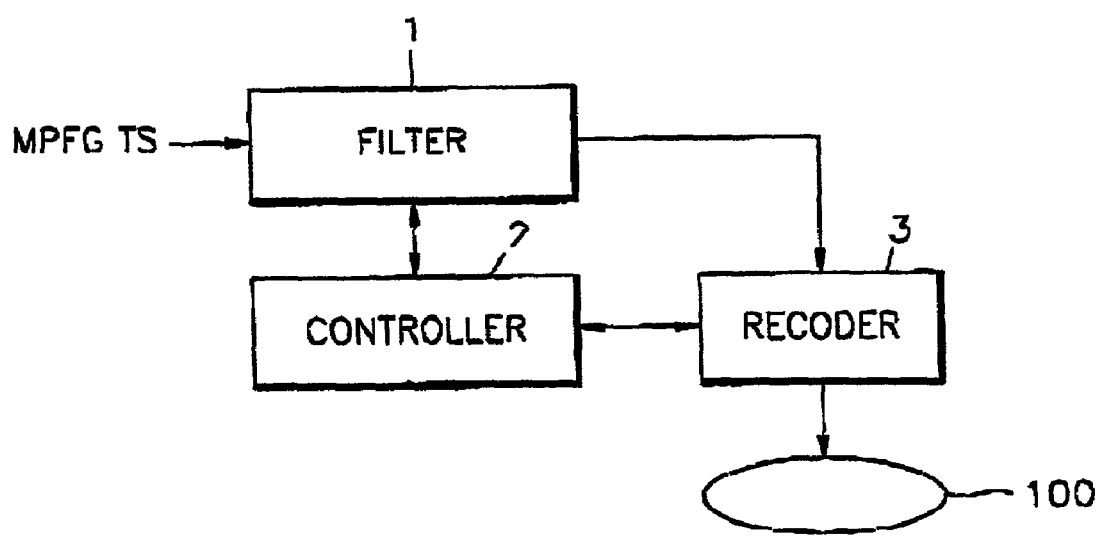
FIG. 1 is a block diagram of a recording apparatus according to a first embodiment of the present invention.

FIG. 1 is a block diagram of a recording apparatus according to a first embodiment of the present invention Referring to FIG. 1, the recording apparatus includes a filter 1, a controller 2, and a recorder 3.

The filter 1 extracts video data from an input bitstream. The recorder 3 decodes the extracted video data, re-encodes the decoded video data in a different way to an originally encoded video data, and records the re encoded video data in an information storage medium, i.e., an optical disc 100. The controller 2 generates and transmits video transform information, which is referred to for decoding the video data into its original state, to the recorder 3

For example, when a bitstream is a digital broadcast stream which is transmitted from a digital TV broadcast station, the filter 1 filters an information packet containing program information data for reproduction and recording. In addition, the filter 1 filters a data packet of a selected program.

A digital broadcast stream is a sequence of data packets of a broadcast program and information packets. There are two types of information packets: a first information packet indicating the identifiers of packets in which the identifiers of data packets of at least one broadcast program are recorded, and a second information packet indicating the identifiers of data packets of the broadcast program. In other words, the identifier of the second information packet is recorded in the first information packet, and the identifiers of data packets of a broadcasting program are recorded in the second information packet. When multiple channels are supported, there are as many second information packets as the number of channels. Each information packet may be physically composed of a plurality of packets. In addition, an information packet can be integrated into one or divided into three portions In the case where a digital broadcast stream is an MPEG transport stream (TS), an information packet containing program information data for reproduction and recording includes a program association table (PAT) packet and a program map table (PMT) packet. The PAT packet is the first information packet, and the PMT packet is the second information packet. A data packet includes a video packet, an audio packet, and/or a hypertext data packet.

Figure 2:
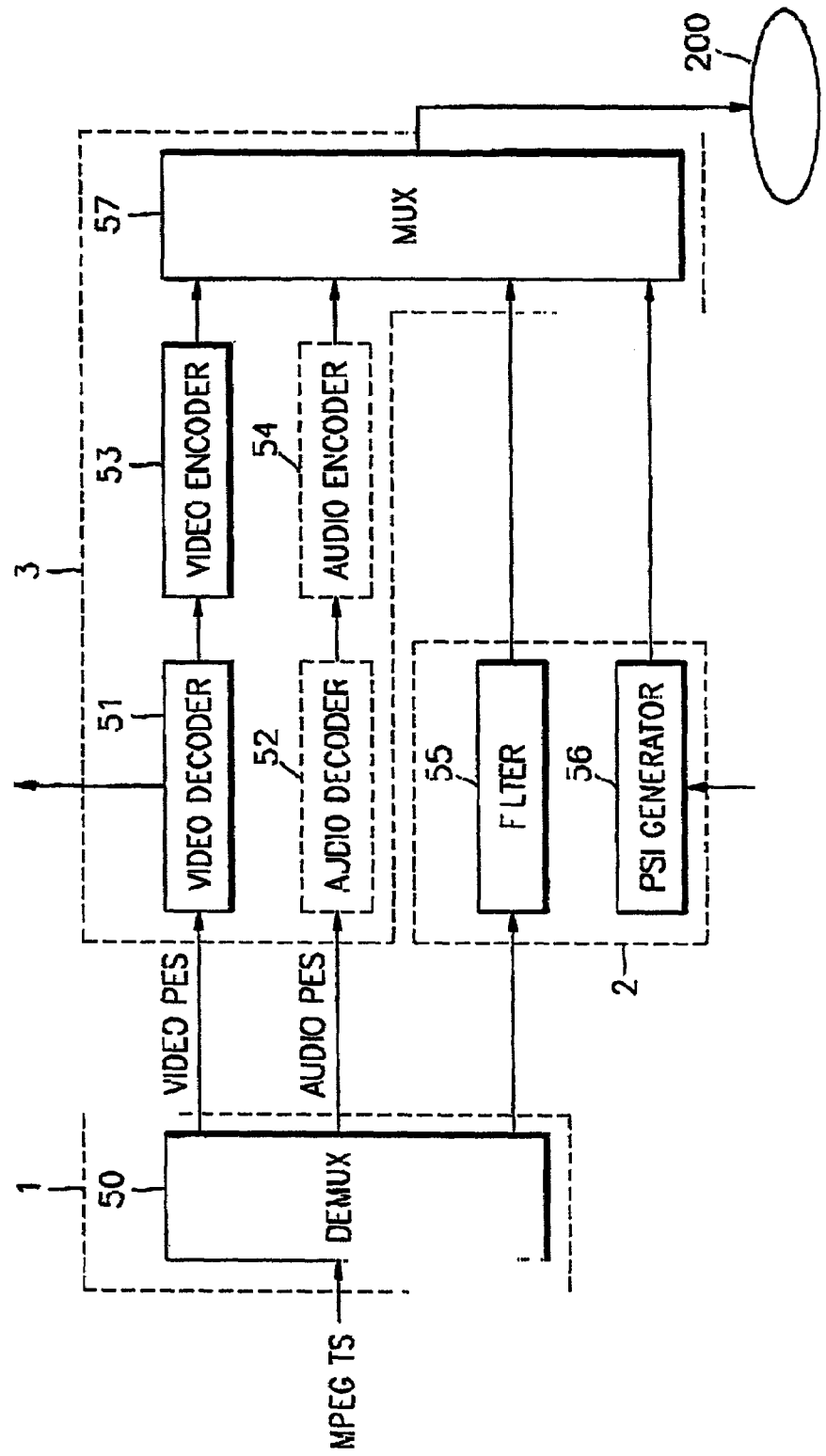
FIG. 2 is a block diagram of a recording apparatus according to a second embodiment of the present invention.

FIG. 2 is an embodiment of FIG. 1 Referring to FIG. 2, a recording apparatus for receiving an MPEG TS and re-encoding it in a different way includes a demultiplexer (DEMUX) 50, a video decoder 51, a video encoder 53, a filter 55, a program specific information (PSI) generator 56, and a multiplexer (MUX) 57. In addition, the recording apparatus may further include an audio decoder 52 and an audio encoder 54.

The DEMUX 50 receives an MPEG TS and separates it into video data (and audio data), hypertext data, and program information data More specifically, the MPEG TS is separated into a video packetized element stream (PES), an audio PES, and hypertext data and program information data and input to the video decoder 51, the audio decoder 52, and the filter 55, respectively. The video decoder 51 decodes the video PES, and the video encoder 53 encodes the decoded video PES in a different way. The encoding in a different way comprehends compression, reduction or expansion of the size of data and so on. The audio decoder 52 decodes the audio PES, and the audio encoder 54 encodes the decoded audio PES in a different way. When the audio decoder 52 and the audio encoder 54 are not provided, the audio PES is directly input to the MUX 57.

The filter 55 filters the hypertext data and necessary program information data. More specifically, the filter 55 filters necessary packets among PAT packets and PMT packets which are contained in the MPEG TS and periodically transmitted. Program information data necessary for recording, reproducing, and searching a program composed of the MPEG TS is recorded in the PAT packets and PMT packets. The PSI generator 56 generates a PSI describing the program. The data structure of the PSI is defined in the MPEG system standard. In addition, the PSI generator 56 extracts the vertical and horizontal resolutions and aspect ratio of the video data output from the video decoder 51, embeds them into a PMT packet as information transform information, and transmits the resulting PMT packet to the MUX 57. The vertical and horizontal resolutions and aspect ratio of the video data are recorded in the header of the video data. The MUX 57 multiplexes the input video data, audio data, hypertext data, and PMT packet containing the video transform information and outputs a multiplexed data stream. The multiplexed data stream is recorded in a program area of an optical disc 200

Alternatively, instead of multiplexing the PMT packet, the MUX 57 may transmit the PMT packet as it is so that the PMT packet is recorded only in a program information data area of the optical disc 200. The PMT packet can be recorded in the form of a PMT in which PMT configuration information is recorded.

FIGS. 3 and 4 are diagrams for explaining an MPEG TS. Referring to FIG. 3, video packets 31, 33, 34, and 37 and audio packets 32, 35, and 36 are multiplexed into an input MPEG TS 300. Once the MPEG TS 300 is received, the video packets 31, 33, 34, and 37 and the audio packets 32, 35, and 36 are separated and recombined into a video stream 302 and an audio stream 301.

Referring to FIG. 4, each of MPEG TS packets 41, 42, 43, 44, 45, 46, and 47 constituting an MPEG TS 400 is assigned a packet identifier. Similarly, once the MPEG TS 400 is received, the packets are separated during decoding, and packets having the same identifiers are combined into a single file. In other words, as shown in FIG. 4, packets having a packet identifier 1 are combined into a stream 401, and packets having a packet identifier 2 are combined into a stream 402. A PAT packet is assigned with a particular packet identifier. In FIG. 4, a packet having a packet identifier 0 is a PAT packet. The identifiers of as many PMT packets as the number of supported channels are recorded in the PAT packet. For simplicity, the PAT packet is expressed as a single packet, but as described above, the PAT packet can be composed of a plurality of packets.

FIG. 5 is a diagram for explaining an information storage medium in which an MPEG broadcast program is recorded by a recording apparatus according to the present invention. Referring to FIG. 5, the data recording area of the information storage medium is divided into a navigation data area in which navigation data is recorded and a program area in which programs #1, #2, , #n are recorded. A program is composed of a bitstream into which video data (and audio data) and hypertext data are multiplexed. Each of the programs #1, #2, . . . , #n indicates a logical unit of content recorded in the information storage medium. The navigation data indicates information necessary for recording, reproducing, or editing a program and general information described in the program.

FIGS. 6A and 6B are diagrams of the data structures of video transform information which is recorded according to embodiments of the present invention. Referring to FIG. 6A, a PMT containing PMT configuration information is recorded in a navigation data area. Referring to FIG. 6B, a PMT packet containing PMT configuration information is embedded in a bitstream and recorded in a program data area.

FIG. 7 is a diagram of the data structure of navigation data according to an embodiment of the present invention. Referring to FIG. 7, the navigation data includes a volume manager table. The volume manager table contains management information for a plurality of programs recorded in an entire information storage medium. The volume manager table includes volume general information VOL_GI about the information storage medium, a program search pointer table PG_SRPT indicating the position of program information, and a program information table PG_IT # about each program.

VOL_GI contains the number of all programs recorded in the information storage medium, PG_Ns. PG_SRPT indicates the offset value of a program information table from the start position of the volume manager table, PG_IT_SRP #. Accordingly, there are as many offset values PG_IT_SRP # as the number of programs.

The program information table PG_IT contains information necessary for reproducing a program. Fields composing the program information table PG_IT will be sequentially described. PAT_SA is a start address of a PAT and indicates the offset value of the PAT from the start position of the PG_IT. PMT_SA is a start address of a PMT and indicates the offset value of the PMT from the start position of the PG_IT. TMAP_SA is a start address of a time map (TMAP) and indicates the offset value of a relevant PAT from the start position of the PG_IT. A PAT has the same structure as a program association table structure defined in the MPEG-2 standard. A PAT can be modified to have a structure in which only PMT information recorded in a PMT packet for a program can be referred to when it is recorded. PMT configuration information contained in a PMT packet is recorded in a PMT. In addition, video transform information according to the present invention is embedded in the PMT. TMAP is a table which maps times to positions (addresses). The structure of TMAP may be the same as that of a DVD-VR or DVD-Streamer.

The video transform information contains a resolution and an aspect ratio. The resolution indicates the resolution of video data contained in a bitstream in an original state The aspect ratio indicates the aspect ratio of a pixel and may indicate the aspect ratio of a display screen as occasion demands.

Figure 8:
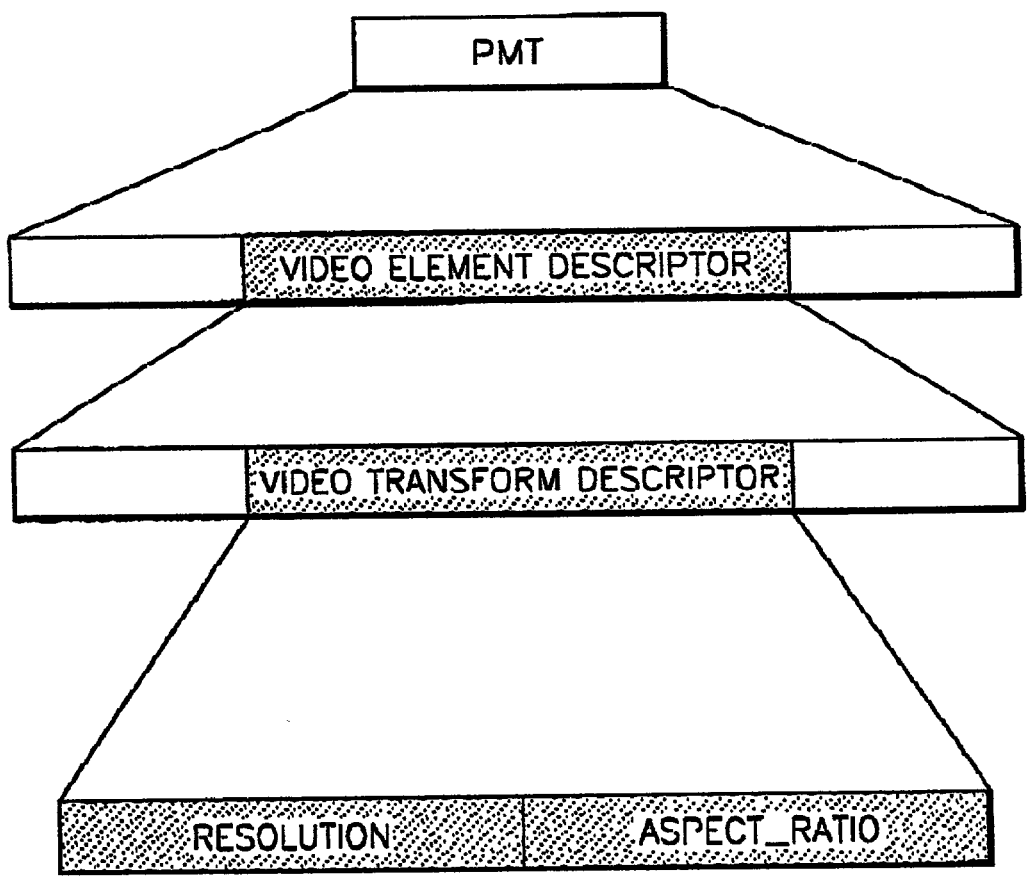
FIG. 8 is a diagram of the data structure of a video transform information according to an embodiment of the present invention.

FIG. 8 is a diagram of the data structure of video transform information according to an embodiment of the present invention. Referring to FIG. 8, the video transform information is embedded in a PMT or PMT packet. A video element descriptor according to MPEG specifications is defined in the PMI packet. The video element descriptor is for recording, for example, information indicating which specification among MPEG-1, MPEG-2, and MPEG-4 the video data complies with. A video transform descriptor which is video transform information according to the present invention is added to the video element descriptor The video transform descriptor indicates the resolution and aspect ratio of the video data before re-encoding. The following is an example of the video transform descriptor contained in the video element descriptor.

```
video_transform_descriptor( ) {
   descriptor_tag
   descriptor_length
   horizontal_size
   vertical_size
   aspect ratio Information
)
```

Here, "descriptor_tag" denotes the identifier of the video transform descriptor, "descriptor_length" denotes the data size of the video transform descriptor, "horizontal_size" denotes a horizontal resolution, "vertical_size" denotes a vertical resolution, and "aspect_ratio_information" denotes an aspect ratio.

A PMT packet according to the MPEG specifications is defined as follows.

```
TS_program_map_section( ) {
   table_id
   section_syntax_indicator
   .
   .
   .
   For (i=0;i<N;i++) {
      descriptor( )
   }
   For (i= 0;i<N1;i++) {
      stream_type
      reserved
      elementary_PID
      reserved
      ES_info_length
      for (i=0;i<N2;i++) {
         descriptor( );
      }
   }
   CRC_32
}
```

Here, "stream_type=0x02" indicates video data. In other words, when "stream_type=0x02", "descriptor ( )" is a video element descriptor describing the video data A video transform descriptor according to the present invention is embedded in a video element descriptor as follows.

```
TS_program_map_section( ) {
   table_id
   section_syntax_indicator
   .
   .
   .
   For (i=0;i<N;i++) {
      descriptor( )
   }
   For (i=0;i<N1;i++) {
      stream_type
      reserved
      elementary_PID
      reserved
      ES_info_length
      for (i=0;i<N2;i++) {
         descriptor( ) [
         .
         .
         video_transform_descriptor( ) {
            descriptor_tag
            descriptor_length
            horizontal_size
            vertical_size
            aspect_ratio_information
         }
         .
         .
         ]
      }
   }
   CRC_32
}
```

A recording method according to the present invention will be described on the basis of the above configuration.

Figure 9:
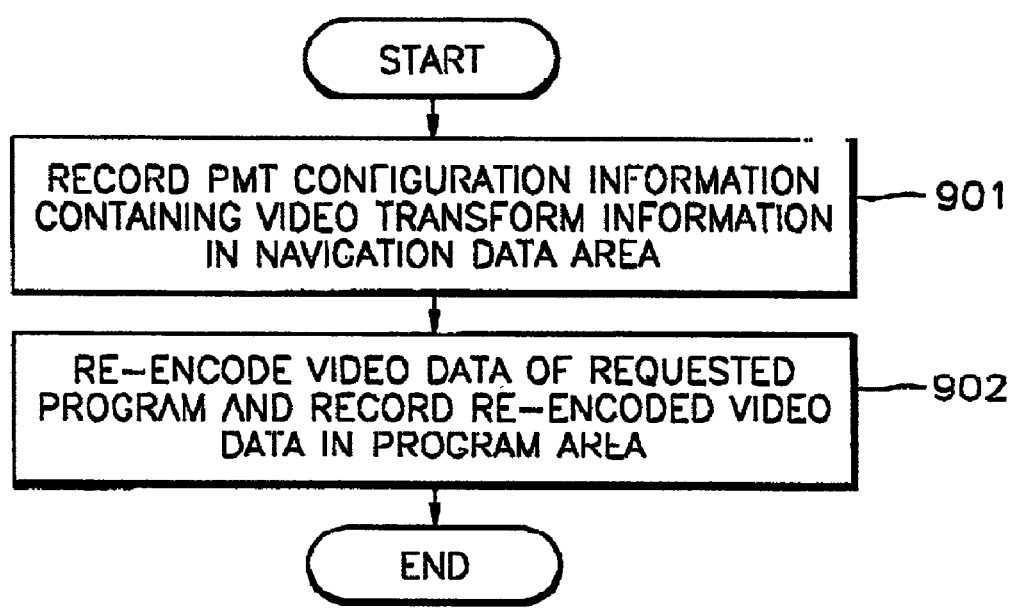
FIG. 9 is a flowchart of a recording method according to a first embodiment of the present invention.
Figure 10:
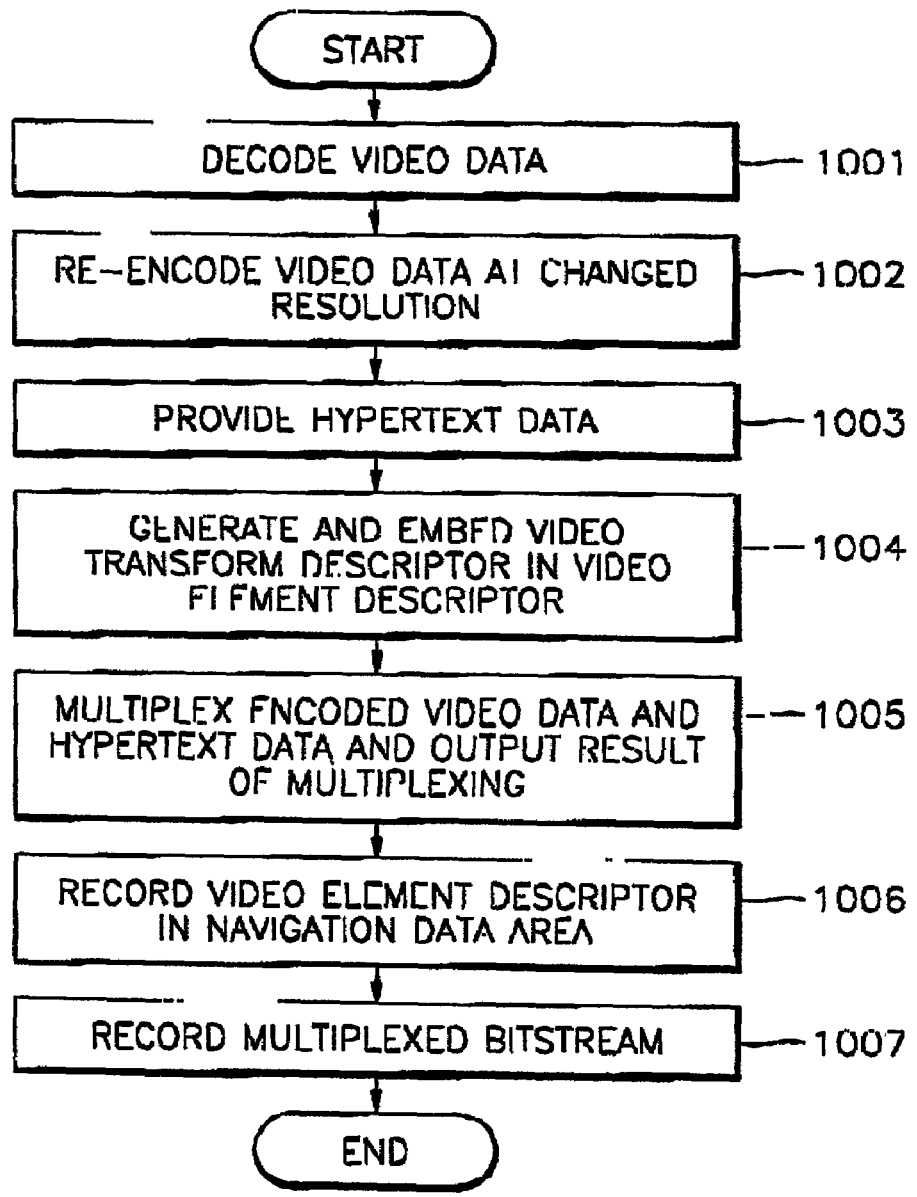
FIG. 10 is a flowchart of a recording method according to a second embodiment of the present invention.

FIG. 9 is a flowchart of a recording method according to a first embodiment of the present invention. Referring to FIG. 9, a recording apparatus generates video transform information for a received MPEG TS, embeds the video transform information in a PMT as PMT configuration information, and records the PMT in a navigation data area which is separate from an area in which a program is recorded in step 901. Here, the recording apparatus can use a PMT packet instead of a PMT. When a PMT is recorded, a recorded space can be reduced, but the PMT must be rearranged into a PAT packet and a PMT packet before being transmitted to an MPEG decoder during reproduction. When a PAT packet and a PMT packet are recorded, rearrangement is not necessary, but a recorded space increases The recording apparatus extracts an MPEG TS packet of a program whose recording is requested by a user, encodes the video data of the MPEG TS packet in a different way to the originally encoded video data, and records the encoded video data in a program area in step 902. Whether a PAT packet and a PMT packet are recorded together is optional. Either of steps 901 and 902 can be performed prior to the other. Alternatively, steps 901 and 902 can be simultaneously performed by a time division method FIG. 10 is a flowchart of a recording method according to a second embodiment of the present invention. Referring to FIG. 10, a recording apparatus receives an MPEG TS into which video data and hypertext data are multiplexed and changes the resolution of video data when recording it. In other words, the video decoder 51 decodes video data in step 1001. The video encoder 53 re-encodes the decoded video data having a changed resolution in step 1002. The filter 55 provides hypertext data, into which the MPEG TS demultiplexed, to the MUX 57 in step 1003. The PSI generator 56 generates and embeds video transform information (a video transform descriptor) in the video element descriptor of a PMT packet in step 1004. The MUX 57 multiplexes the encoded video data (and audio data) and the hypertext data and outputs the result of multiplexing in step 1006. The recording apparatus records PMT configuration information in a navigation data area in step 1006 and records a multiplexed bitstream in a program area in step 1007

Figure 11:
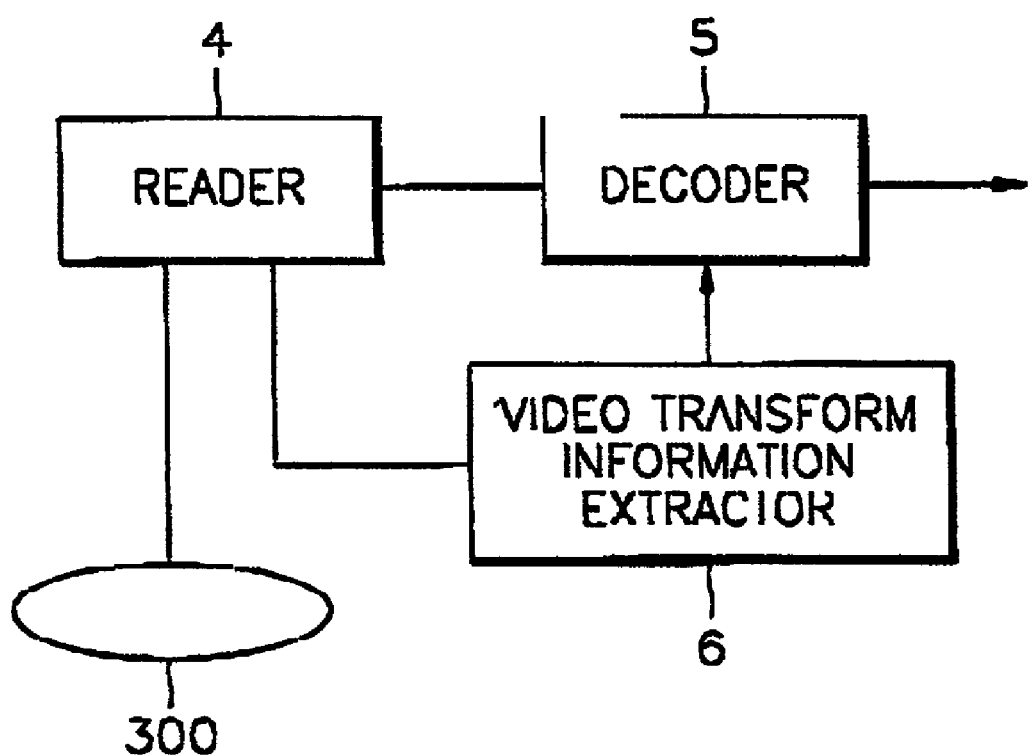
FIG. 11 is a block diagram of a reproducing apparatus according to a first embodiment of the present invention.
Figure 12:
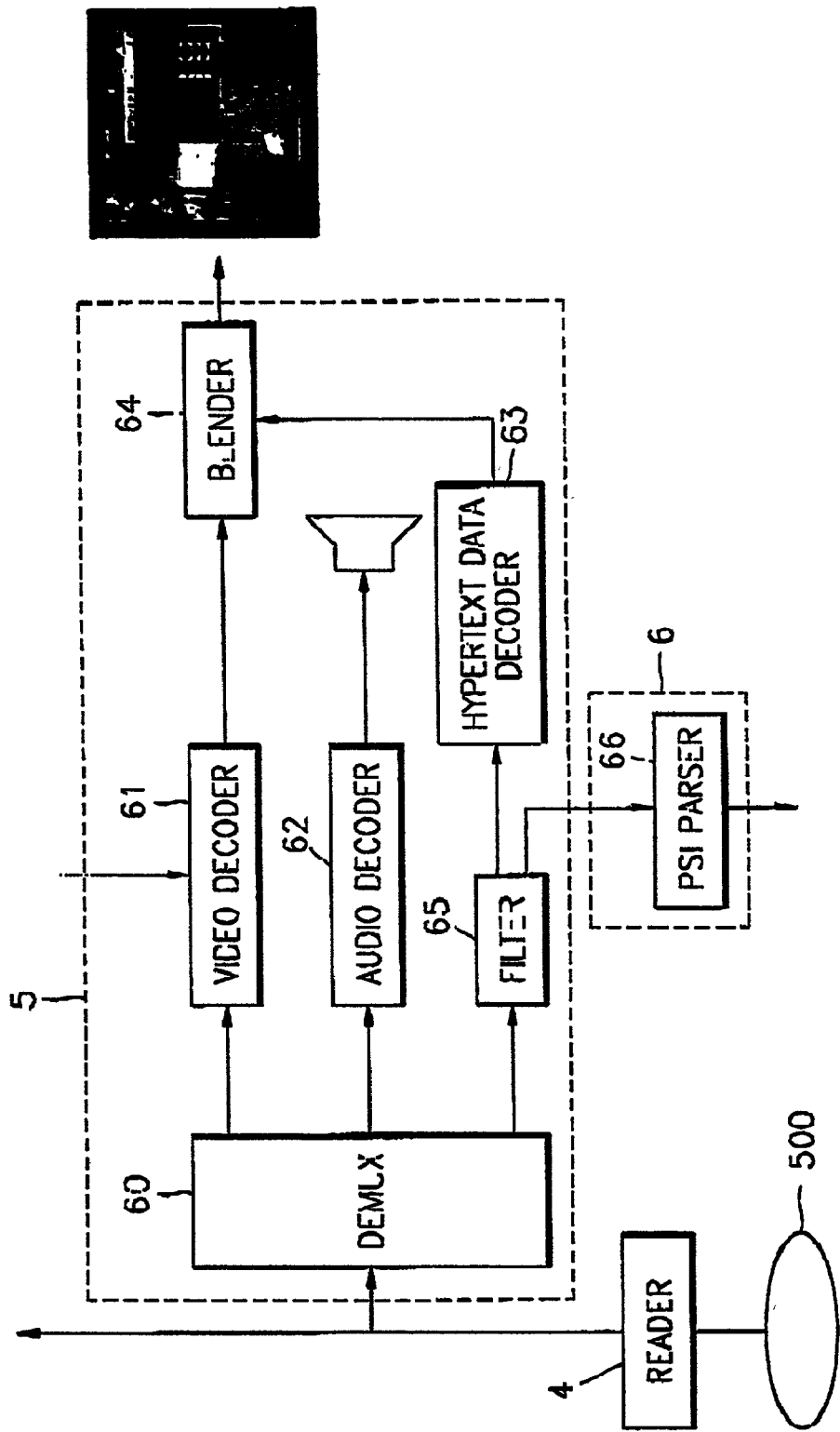
FIG. 12 is a block diagram of a reproducing apparatus according to a second embodiment of the present invention.

FIG. 11 is a block diagram of a reproducing apparatus according to the present invention. Referring to FIG. 11, the reproducing apparatus includes a decoder 5, a video transform information extractor 6, and a reader 4. The reader 4 reads bitstream data and video transform information from an optical disc 300. The video transform information extractor 6 extracts video transform information from the reader 4 and provides it to the decoder 5. The decoder decodes the bitstream data into its original state referring to the video transform information FIG. 12 shows an embodiment of the reproducing apparatus of FIG. 11. Referring to FIG. 12, the reproducing apparatus includes a reader 4, a DEMUX 60, a video decoder 61, an audio decoder 62, a filter 65, a PSI parser 66, a hypertext data decoder 63, and a blender 64. In this embodiment, the PSI parser 66 is provided as the video transform information extractor 6.

The reader 4 reads a bitstream from an optical disc 500 used as an information storage medium and outputs the bitstream. Video data (and audio data) and hypertext data have been multiplexed in the bitstream. Particularly, video transform information has been multiplexed in the bitstream in the form of a PMT packet according to the present invention. The bitstream is output as a digital signal or input to the DEMUX 60. The DEMUX 60 demultiplexes the bitstream into video data, audio data, hypertext data, and program information data. The filter 65 filters the hypertext data and program information data to output necessary data only. The PSI parser 66 parses video transform information from the program information data and transmits the video transform information to the vide decoder 61. The video decoder 61 decodes the video data according to the original resolution and aspect ratio (video transform information) provided from the PSI parser 66 and provides the decoded video data to the blender 64. The audio decoder 62 decodes the audio data and provides the decoded audio data to a sound output device. The hypertext data decoder 63 decodes the hypertext data output from the filter 65 and provides the decoded hypertext data to the blender 64. The blender 64 blends the video data with the hypertext data and outputs the result of blending.

Figure 13:
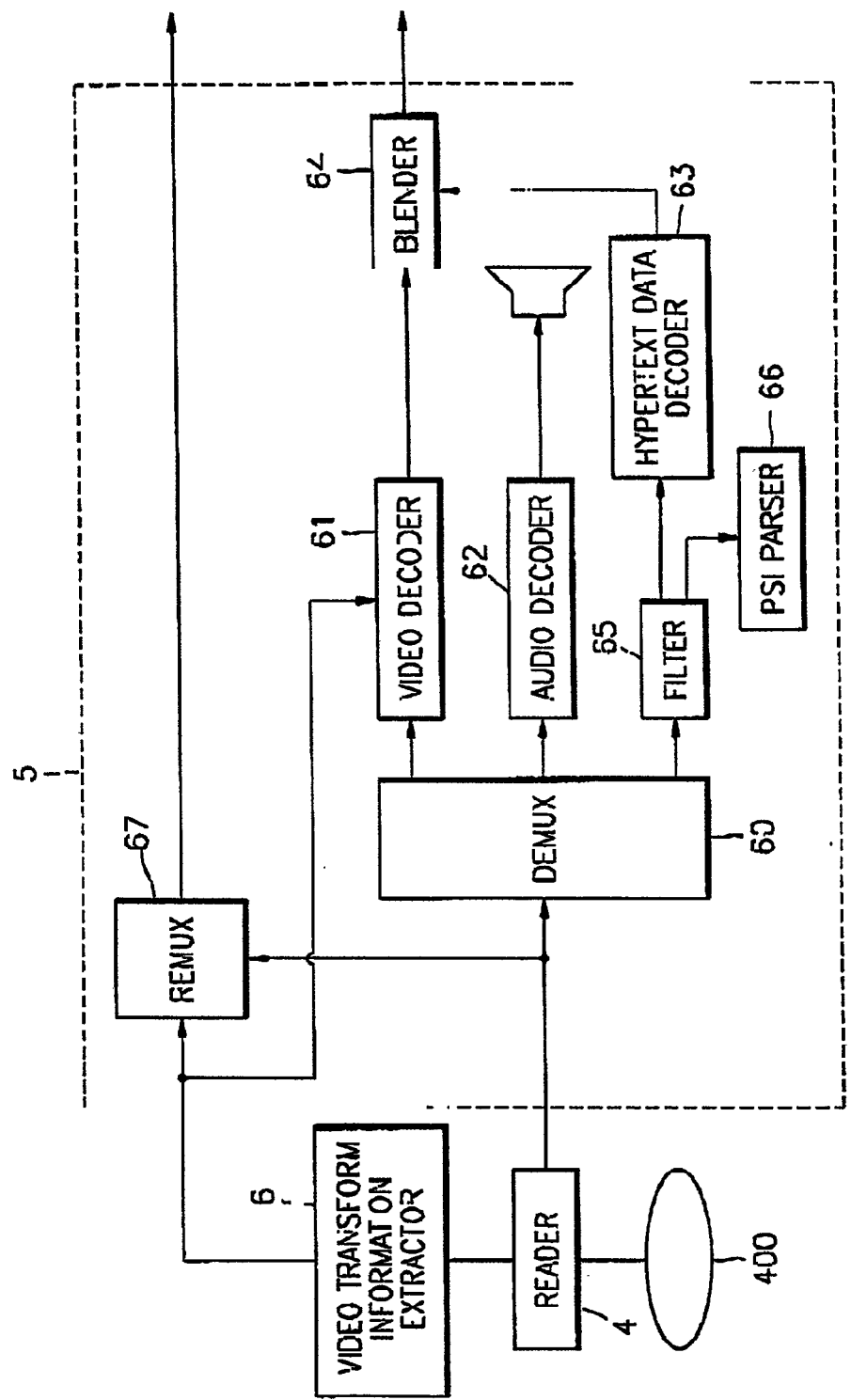
FIG. 13 is a block diagram of a reproducing apparatus according to a third embodiment of the present invention.

FIG. 13 shows another embodiment of FIG. 11. Referring to FIG. 13, a reproducing apparatus includes a reader 4, a video transform information extractor 6, a remultiplexer (REMUX) 67, a DEMUX 60, a video decoder 61, an audio decoder 62, a filter 65, a PSI parser 66, a hypertext data decoder 63, and a blender 64. Particularly, in this embodiment, the PSI parser 66 included in the decoder 5, and the video transform information extractor 6 is provided separately from the PSI parser 66. In addition, unlike the reproducing apparatus of FIG. 12, the decoder 5 further includes the REMUX 67.

The reader 4 reads a bitstream from an optical disc 400 which is an information storage unit and outputs it to the video transform information extractor 6 and/or the DEMUX 60. Video data (and audio data) and hypertext data have been multiplexed in the bitstream. In addition, the reader 4 reads video transform information, which has been recorded as PMT configuration information, from a navigation data area and outputs it to the video transform information extractor 6

The video transform information extractor 6 extracts the video transform information and provides it to the REMUX 67 and/or the video decoder 61. The REMUX 67 multiplexes the bitstream and the video transform information to output a digital signal. The DEMUX 60 demultiplexes the bitstream into video data, audio data, hypertext data, and program information data. The video decoder 61 decodes the video data according to the original resolution and aspect ratio (video transform information) provided from the video transform information extractor 6 and provides the decoded video data to the blender 64. The audio decoder 62 decodes the audio data and provides the decoded audio data to a sound output device. The hypertext data decoder 63 decodes the hypertext data output from the filter 65 and provides the decoded hypertext data to the blender 64. The blender 64 blends the video data with the hypertext data and outputs the result of blending. The program information data is processed by the filter 65 and parsed by the PSI parser 66.

A reproducing method according to the present invention will be described on the basis of the above configuration.

Figure 14:
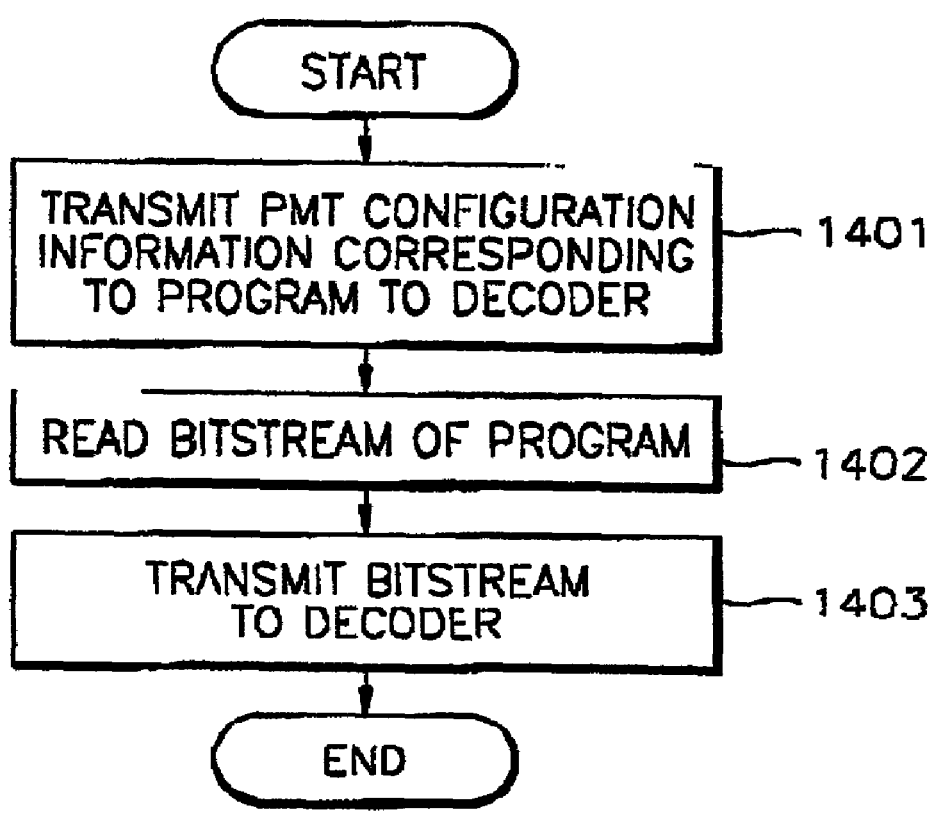
FIG. 14 is a flowchart of a reproducing method according to a first embodiment of the present invention.

FIG. 14 is a flowchart of a reproducing method according to a first embodiment of the present invention. Referring to FIG. 14, the video transform information extractor 6 transmits PMT configuration information corresponding to a program to be reproduced to the decoder 5 in step 1401. The PMT configuration information contains video transform information. The reader 4 reads a bitstream of the program in step 1402 and transmits it to the decoder 5 in step 1403 The decoder 5 multiplexes the bitstream and the video transform information into a digital signal.

Figure 15:
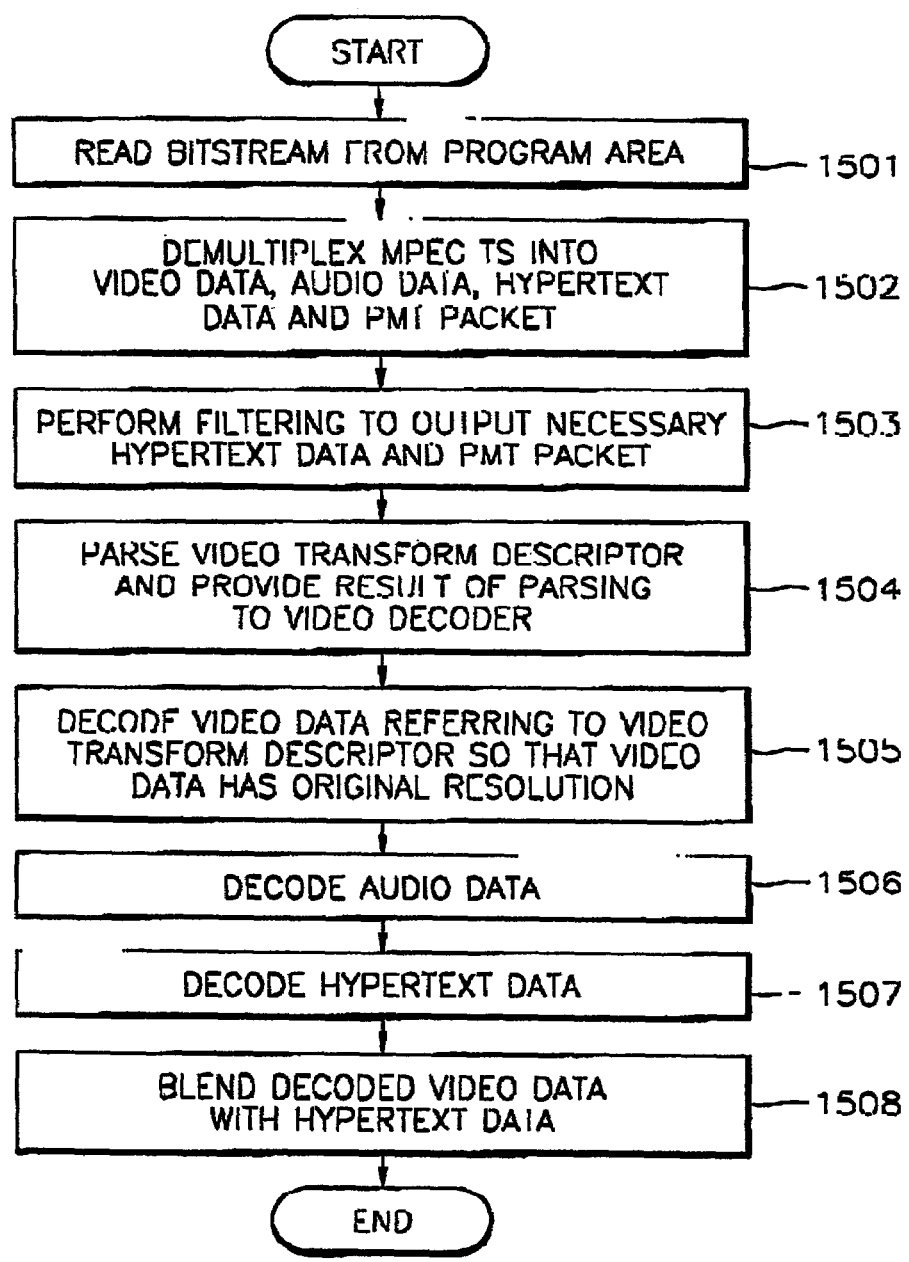
FIG. 15 is a flowchart of a reproducing method according to a second embodiment of the present invention.

FIG. 15 is a flowchart of a reproducing method according to a second embodiment of the present invention. Referring to FIG. 15, the reader 4 reads an MPEG TS, into which video transform information has been multiplexed as PMT configuration information, from the optical disc 500 and outputs the MPEG TS in step 1501. A reproducing apparatus reads and reproduces the MPEG TS containing video data which has been recorded at a changed resolution. In other words, the DEMUX 60 demultiplexes the MPEG TS read from the optical disc 500 into video data, audio data, hypertext data, and program information data in step 1502. The filter 65 performs filtering to output necessary hypertext data and program information data in step 1503. The PSI parser 66 parses a video transform descriptor received from the filter 65 and provides the parsed video transform descriptor to the video decoder 61 in step 1504. The video decoder 61 decodes the video data referring to the video transform descriptor so that the video data can have the original resolution in step 1505. The audio decoder 62 decodes the audio data and outputs the decoded audio data to a sound output device (a speaker) in step 1506. The hypertext data decoder 63 decodes the hypertext data in step 1507. The blender 64 blends the decoded video data and the decoded hypertext data and outputs the result of blending to a display device (not shown) in step 1508. Therefore, the video data and the hypertext data are displayed in an original state.

Figure 16:
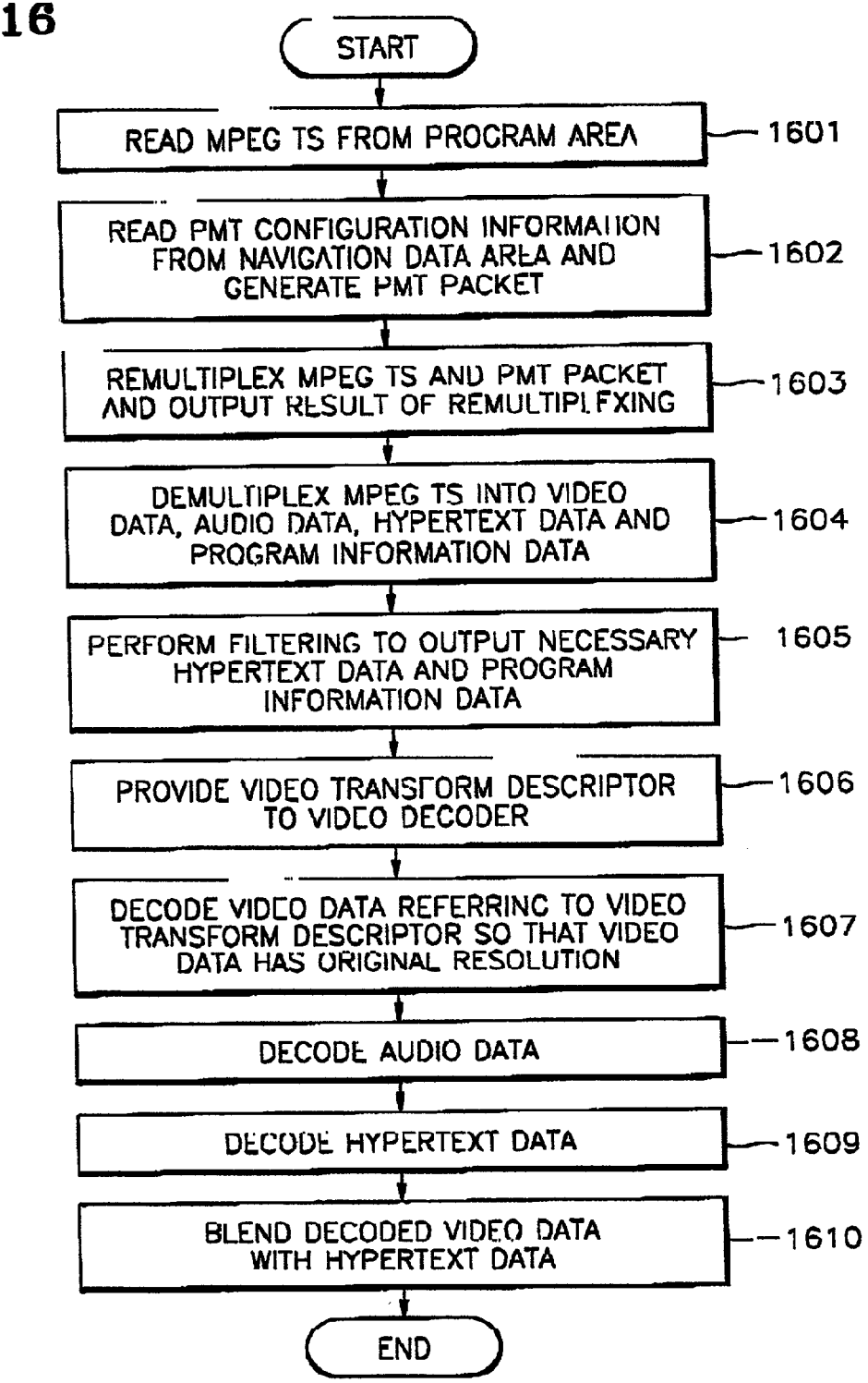
FIG. 16 is a flowchart of a reproducing method according to a third embodiment of the present invention.

FIG. 16 is a flowchart of a reproducing method according to a third embodiment of the present invention. Referring to FIG. 16, the reader 4 reads an MPEG TS from the program area of the optical disc 400 and outputs it to the REMUX 67 and the DEMUX 60 in step 1601. In step 1602, the reader 4 reads PMT configuration information from the navigation data area of the optical disc 400, and the video transform information extractor 6 generates a PMT packet based on the PMT configuration information and provides the PMT packet to the REMUX 67. The REMUX 67 multiplexes the MPEG TS and the PMT packet into a digital signal in step 1603. The DEMUX 60 demultiplexes the MPEG TS into video data, audio data, hypertext data, and program information data in step 1604. The filter 65 performs filtering to output necessary hypertext data and program information data in step 1605. The video transform information extractor 6 provides video transform information (a video transform descriptor) to the video decoder 61 in step 1606 The video decoder 61 decodes the video data referring to the video transform information (the video transform descriptor) so that the video data can have the original resolution in step 1607 The audio decoder 62 decodes the audio data and outputs the decoded audio data to a sound output device (a speaker) in step 1608. The hypertext data decoder 63 decodes the hypertext data in step 1609. The blender 64 blends the decoded video data and the decoded hypertext data and outputs the result of blending to a display device (not shown) in step 1610. Therefore, the video data and the hypertext data are displayed in an original state.

The above-described recording and reproducing methods can be embodied as computer programs. Codes and code segments which compose the programs can be easily inferred by computer programmers skilled in the art. In addition, the programs are recorded in a computer readable medium. The programs are read and executed by a computer, thereby realizing methods of recording and reproducing an MPEG broadcast program. The computer readable medium may be a magnetic recording medium, an optical recording medium, or a carrier wave medium.

As described above, according to the present invention, video data and hypertext data can be properly reproduced even if the video data has been re-encoded in a different way to the originally encoded data.

What is claimed is:

1. A method of recording video data in an information storage medium, the method comprising:
   decoding originally encoded video data;
   re-encoding the decoded video data so that the re-encoded video data has a different resolution from the originally encoded video data;
   generating video transform information, including the original resolution and an aspect ratio of the originally encoded video data;
   multiplexing the generated video transform information and the re-encoded video data into a bitstream; and
   recording the multiplexed bitstream in the information storage medium.

2. The method of claim 1, wherein the video transform information is included in a program map table (PMT) packet.

* * * * *